(12) United States Patent
Ramesh et al.

(10) Patent No.: US 7,672,667 B2
(45) Date of Patent: Mar. 2, 2010

(54) BROADCAST-CENTRIC CELLULAR COMMUNICATION SYSTEM

(75) Inventors: Rajaram Ramesh, Cary, NC (US);
Kambiz Zangi, Chapel Hill, NC (US);
Kumar Balachandran, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 976 days.

(21) Appl. No.: 11/380,474

(22) Filed: Apr. 27, 2006

(65) Prior Publication Data

US 2007/0167180 A1    Jul. 19, 2007

Related U.S. Application Data

(60) Provisional application No. 60/743,133, filed on Jan. 17, 2006.

(51) Int. Cl.
H04W 4/00    (2009.01)

(52) U.S. Cl. .................. 455/422.1; 455/403; 455/3.01; 455/426.1; 455/515; 370/328; 370/338; 370/350; 370/324

(58) Field of Classification Search ............... 455/3.01, 455/515, 403, 517, 426.1, 458, 561, 422.1, 455/423, 3.03; 379/170, 56.1
See application file for complete search history.

(56) References Cited

U.S. PATENT DOCUMENTS

| | | | | |
|---|---|---|---|---|
| 6,577,868 B1 * | 6/2003 | Vialen et al. | ............... | 455/441 |
| 6,816,474 B2 * | 11/2004 | Kang et al. | .................. | 370/335 |
| 6,928,287 B2 * | 8/2005 | Trott et al. | .................... | 455/447 |
| 7,218,936 B2 * | 5/2007 | Rinne et al. | .................. | 455/447 |
| 7,450,543 B2 * | 11/2008 | Laroia et al. | ................. | 370/331 |
| 2003/0119444 A1 * | 6/2003 | Yamaguchi | .................. | 455/21 |
| 2004/0171402 A1 * | 9/2004 | Tamaki et al. | ............... | 455/522 |
| 2005/0101330 A1 * | 5/2005 | Chang et al. | ................ | 455/446 |
| 2006/0025157 A1 * | 2/2006 | Kuwahara et al. | ........ | 455/456.1 |
| 2006/0146779 A1 * | 7/2006 | Lee et al. | ..................... | 370/345 |
| 2006/0199596 A1 * | 9/2006 | Teauge et al. | ............... | 455/458 |
| 2006/0291371 A1 * | 12/2006 | Sutivong et al. | ............ | 370/208 |
| 2007/0167159 A1 * | 7/2007 | Ramesh et al. | .............. | 455/434 |
| 2007/0167181 A1 * | 7/2007 | Ramesh et al. | .............. | 455/502 |

FOREIGN PATENT DOCUMENTS

EP    1758328 A2    2/2007

\* cited by examiner

*Primary Examiner*—Huy Phan

(57) ABSTRACT

A broadcast-centric cellular communication system improves broadcast channel performance by exploiting the benefits of macro-diversity in a cellular communication system having a plurality of base stations that transmit signals within a plurality of associated cells. System-specific control information common to all cells is synchronously and simultaneously broadcast from multiple base stations using a broadcast channel that is identical across the entire system. Cell-specific control information is transmitted individually from each base station. Mobile stations use the broadcast information for initial synchronization to the system, and to obtain most relevant system information. After system synchronization, the mobile stations identify the connected cell through a physical layer characteristic, and perform initial access to the system.

21 Claims, 3 Drawing Sheets

FIG. 1

| Cell 1 | Broadcast Transmission (11) | Data and other transmission for cell 1 (12) |
| Cell 2 | Broadcast Transmission (11) | Data and other transmission for cell 2 (12) |

FIG. 2

| System-specific Information (common to all cells) |
| Information specific to Cell 1 |
| Information specific to Cell 2 |
| ................................................................................ |
| System-specific Information (common to all cells) |

FIG. 3

| | 11 | 11 | 13 | 12 | |
| Cell 1 | SBCCH | SBCCH | Cell 1 broadcast | Data and other transmissions for cell 1 | |
| Cell 2 | SBCCH | SBCCH | | Data and other transmissions for cell 2 (12) | Cell 2 broadcast (13) |

BROADCAST-CENTRIC CELLULAR COMMUNICATION SYSTEM

CROSS-REFERENCE TO RELATED APPLICATIONS

This application claims benefit of U.S. Provisional Application No. 60/743,133 filed Jan. 17, 2006, the disclosure of which is hereby incorporated by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to mobile radio telecommunication systems. More particularly, and not by way of limitation, the present invention is directed to a system and method for improving broadcast, paging, and synchronization performance for a cellular communication system by exploiting the benefits of macro-diversity.

Cellular systems send broadcast signals that are received by mobile stations to obtain important information that is used for proper system operation. Some of this information is system-specific, such as the system ID, the operator name, the services supported, and so on. Some of the information is cell-specific, such as the maximum power to be used by mobile stations to access the cell, and so on. In general, all broadcast information is sent independently on each cell in the entire cellular network belonging to that operator. In GSM, this information is sent on the Broadcast Control Channel (BCCH) or the Packet Broadcast Control Channel (PB-CCH). Similar common channels exist for CDMA and WCDMA systems. System-specific as well as cell-specific information is sent on every cell, and bandwidth resources are separately allocated in each cell for the purpose of broadcast.

Conventional cellular systems are designed mainly for unicast services, wherein point-to-point communication is the primary goal, and is typically handled within a single cell where the mobile station is present. All other functionalities are built to support the primary objective, and are thus designed within the purview of a single cell. For example, in GSM, CDMA2000, and WCDMA, in order to support voice and data calls, means are provided in each cell for the mobile to synchronize to a suitable cell it has selected, and to obtain the broadcast information sent by the base station in that cell. Following such synchronization and reading of broadcast-information, the mobile station can access the system and set up communication links.

In GSM, each cell has a Frequency Correction Channel (FCH), which enables coarse frequency and time synchronization to the cell and provides a pointer to the Synchronization Channel (SCH), which enables finer synchronization to the cell. The SCH allows identification of the cell and a pointer to the BCCH. The BCCH contains all the broadcast information relevant to the system and the cell, and directs further point-to-point communication in the cell. Each of these logical channels is present in each individual cell. The FCH is the same signal in all cells, but a terminal can only synchronize to the FCH of one particular cell. Thus, the benefit of having the same FCH in every cell is essentially helpful only in lowering the search space of the terminal.

In CDMA2000, a common pilot channel is used for initial synchronization. The same common pilot channel is used in all cells, but a variable offset (n*64 chips) distinguishes cells. A terminal attempting to synchronize to the common pilot channel gets connected to a cell with a particular offset. Even a 64-chip offset, leave alone a multiple of 64, is too large for typical path search windows, and it is unlikely that it can be exploited for path combining from different base stations. A synchronization channel that provides further information is closely associated with the common pilot channel and provides a pointer to the broadcast control channel that provides additional information to the mobile station for further communication.

In WCDMA, synchronization is achieved by means of a Primary Synchronization code that is common to all base stations. Since base stations are typically asynchronous, it is most likely that a terminal synchronizes to one particular cell. Further, a secondary synchronization code provides information on frame boundaries, and indicates a group of scrambling codes. By searching the group of scrambling codes, the terminal identifies the cell and is in a position to receive the system broadcast information.

Macro-diversity is defined as the reception of similar information from a variety of radio links that are separated by a significant spatial distance between transmission sources. The receiver can improve the quality of the received signal by suitably combining the signals from these links. The term "similar information" is to be understood to refer to the ability to embed the same information, encoded optionally in differing ways, as all or part of two or more radio transmissions. A significant spatial distance, as applied to the qualifier, "macro," is meant to denote cases where the transmitting radio sources are separated by distances including large fractions of the cell size, as well as capable of encompassing several base station sites. Encoding information in this regard pertains to operations such as scrambling, interleaving, or channel encoding and combinations thereof.

A common way of performing macro-diversity is to transmit the exact same information from multiple transmitters at substantially the same time. The receiver receives a sum of signals that have passed through different radio links, and uses appropriate demodulation methods to obtain a performance benefit. One benefit of this way of performing macro-diversity is that the receiver is not substantially different from a receiver that is designed to receive a signal from only one transmitter.

In the GSM, CDMA2000, and WCDMA systems discussed earlier, it is clear that even if a synchronization signal that is essentially similar is present across multiple cells, the systems are not configured to permit the use of macro-diversity to enhance system synchronization. The uniformity of the signals is present just as a means to simplify initial synchronization.

More recently, there has been significant interest in offering broadcast services over the cellular network, wherein the same signal is broadcast to many users across multiple cells. This has lead to services such as Multimedia Broadcast/Multicast Service (MBMS) for WCDMA and broadcast TV services, such as Digital Video Broadcast-Handheld (DVB-H), to handheld terminals. Since these services are broadcasting information that is possibly common to all users, these services use methods such as macro-diversity to help improve the performance of information delivery to users in the system. To date, these broadcast techniques have been used for broadcasting services. Indeed, the design imperatives that have been used for such services may be extended in a novel direction for the purpose of broadcasting system information as well, even in a system whose primary purpose is point-to-point communication.

Solutions in use for broadcasting system information in conventional cellular systems cannot exploit any of the advantages provided by macro-diversity because the information is different from cell to cell. The current art needs an improved system and method for delivering all the relevant broadcast information to mobile stations operating in a cellular communication system, while at the same time allowing the use of point-to-point services to deliver data to particular users. The present invention provides such a system and method.

BRIEF SUMMARY OF THE INVENTION

The present invention improves broadcast channel performance for a cellular communication system by exploiting the benefits of macro-diversity, thereby improving the performance of system information delivery for system-specific and cell-specific information. The cellular system uses a broadcast channel that is identical across the entire system for the purpose of initial synchronization to the system (rather than one cell in the system), and mobile stations obtain most relevant system information from the system-wide broadcast channel. After obtaining such system information, mobile stations identify a suitable cell from which to obtain cell-specific control information and to subsequently connect to the system via the chosen cell.

Thus, in one aspect, the present invention provides a system and associated apparatus for enabling the use of macro-diversity to enhance the performance of broadcast and control channel reception in a cellular network.

In another aspect, the present invention is directed to a wireless multi-cellular telecommunication system having a plurality of base stations that transmit signals within a plurality of associated cells. The system includes means for synchronously and simultaneously broadcasting, from a predefined group of base stations, system-specific control information common to all cells associated with the base stations in the group, and means for transmitting cell-specific control information individually from each base station in the group.

In another aspect, the present invention is directed to a method of delivering broadcast information to mobile stations operating in a cellular communication system having a plurality of base stations that transmit signals within a plurality of associated cells. The method includes synchronously and simultaneously broadcasting from a predefined group of base stations, system-specific control information common to all cells. The method also allows each individual base station in the group to transmit cell-specific control information.

In another aspect, the present invention is directed to a wireless multi-cellular telecommunication system having a plurality of base stations that transmit signals within a plurality of associated cells. The system includes means for synchronously and simultaneously broadcasting from a predefined group of base stations, system-specific control information common to all cells and a list of cell identifiers. The system also includes means responsive to an initial system access by a mobile station, for transmitting more detailed system information to the mobile station using a point-to-point link.

In another aspect, the present invention is directed to a method of delivering broadcast information to mobile stations operating in a cellular communication system having a plurality of base stations that transmit signals within a plurality of associated cells. The method includes synchronously and simultaneously broadcasting from a predefined group of base stations, system-specific control information common to all cells and a list of cell identifiers; and after a mobile station has made an initial system access, transmitting more detailed system information to the mobile station using a point-to-point link.

In another aspect, the present invention provides a system and apparatus for enabling broadcast information to be sent to users in a cellular network from a plurality of radio sources, while enabling users to gain access to cell-specific information and enabling the users to engage in point-to-point communication.

BRIEF DESCRIPTION OF THE SEVERAL VIEWS OF THE DRAWINGS

In the following section, the invention will be described with reference to exemplary embodiments illustrated in the figures, in which:

FIG. 1 is an illustrative drawing of the transmission sequences utilized in two cells in a first embodiment of the present invention;

FIG. 2 is an illustrative drawing of an exemplary message structure of the broadcast message according to the first embodiment;

FIG. 3 is an illustrative drawing of the transmission sequences utilized in two cells in a second embodiment of the present invention;

DETAILED DESCRIPTION OF THE INVENTION

Figure 4:
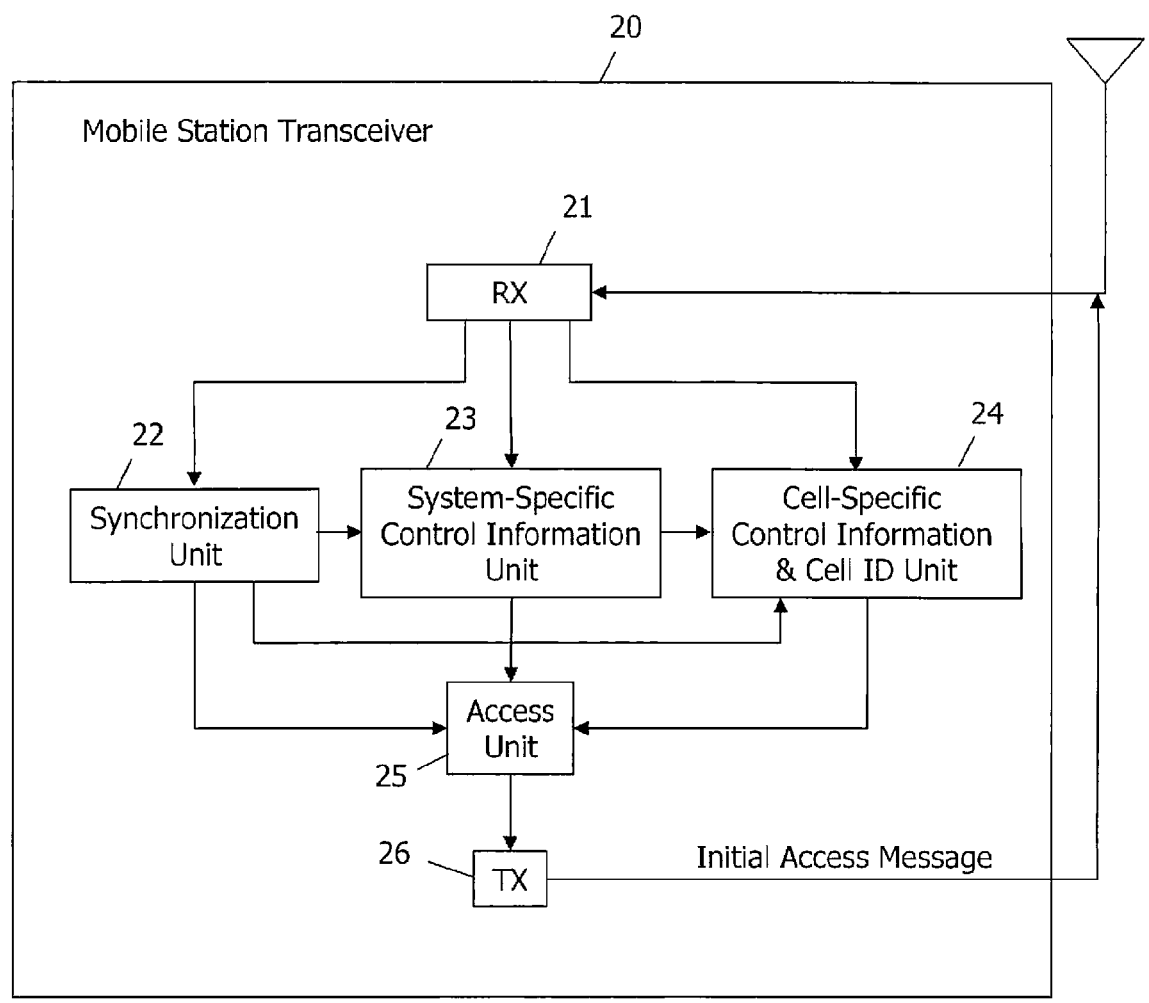
FIG. 4 is a simplified block diagram of a mobile station transceiver modified in accordance with an exemplary embodiment of the present invention.

The present invention improves broadcast channel performance for a cellular communication system by exploiting the benefits of macro-diversity, thereby improving the performance of system information delivery for system-specific and cell-specific information.

The present invention provides a broadcast-centric cellular communication system. Since multi-cell broadcast is expected to be an integral and important part of any future cellular system, it makes sense to exploit its advantages in the basic design and functionality of the system. In the present invention, the cellular system uses a broadcast channel that is identical across the entire system for the purposes of initial synchronization to the system (rather than one cell in the system), and mobile stations obtain most relevant system information from the system-wide broadcast channel. After obtaining such system information, mobile stations identify a suitable cell from which to obtain cell-specific control information and to subsequently connect to the system via the chosen cell. In contrast to past and current cellular networks that started with unicast services and are more recently attempting to retrofit multicast services, the present invention starts with the multicast design, while still allowing point-to-point services with good performance.

The present invention sends system-specific information over all cells in essentially the same manner as information for broadcast services is sent. Thus, the same information is sent, at the same time, from all base stations. Mobile stations receive the information from multiple base stations and use macro-diversity combining to obtain the benefits of macro-diversity. Orthogonal Frequency Division Multiplexing (OFDM) is a preferred choice for the air-interface since it allows for receiver implementations of low complexity that realize most of the gains of macro-diversity. However, the principles underlying this invention are applicable to a variety of air-interfaces, and the exemplary embodiment should not be seen as precluding those same air-interfaces.

With OFDM, the actual signal broadcast from each base station should be the same (including data, pilots, etc.) so that the mobile station can receive one single signal and exploit the effects of macro-diversity. Additionally, since the same message is simultaneously broadcast from multiple cells, the transmissions from neighboring cells contribute useful signal strength rather than interference. Thus, the broadcast transmission is received with much better quality by the mobile stations in the system.

Given the virtues of the signal used for broadcast service over the conventional BCCH, the invention also utilizes the basic principles of this invention for traditional cellular system operations. A mobile device in a cellular network must be connected and synchronized to the system. The prevailing sequence of operations used to achieve this need is a consequence of the use of non-synchronized networks and signaling schemes in which the complexity of equalization was prohibitively high for long channel-impulse responses. Efficient deployment of macro-diversity requires a synchronized network.

In one embodiment, the present invention utilizes a Single System Synchronization Channel (SSCH) that is uniform across the entire system and is synchronized in time in all cells. The SSCH has some unique characteristics that mobile terminals can use for obtaining initial frequency and time synchronization information. Terminals synchronize to the SSCH using its unique characteristics and utilize macro-diversity combining in the synchronization process. Since all cells are synchronized, the terminal has no means to distinguish cells at this stage, and uses the entire power available from all cells for the purposes of synchronization. The use of one synchronization signal across multiple cells improves the interference environment, thus leading to higher synchronization probabilities and fewer false alarms.

Associated with the SSCH is a System Broadcast Control Channel (SBCCH) that sends the same broadcast information across all cells in the system. The SBCCH is also synchronized across all cells and has a pilot pattern that is the same in all cells. By using this pilot pattern, terminals obtain channel estimates using the entire received signal, and demodulate the SBCCH control information messages. These messages contain all relevant system information that is common to all cells in the system. The message may also contain information on pointers to control information that is specific to different cells, and cell identifiers for different cells. Though the actual number of cells in a system may be large, the number of cells that are different in terms of physical layer parameters is smaller, and the system only needs to distinguish the cells in this manner. For example, the number of unique cells in GSM is governed by the Base Station Identity Code (BSIC) values; the number of unique cells in CDMA2000 is equal to the number of code offsets; and the number of unique cells in WCDMA is equal to the number of unique scrambling codes. In addition, the system can reuse these identifiers at some distance with a low probability of interference. Thus the message sizes of the SBCCH are within reasonable limits. As a mechanism for cell identification (i.e., a way for an MS to determine a suitable cell to which it can connect), the present invention utilizes different synchronization patterns, pilot patterns, and the like at the physical layer.

After reading the SBCCH control information, the mobile station performs focused searches at different locations in time and frequency for the cell identifiers for particular cells. Since these searches are focused, the probability of false alarm is rather low. Thus, the terminal is able to reliably find the signals bearing the cell identifiers, even though they are subject to more interference than the SSCH and SBCCH. Using other pointers from the SBCCH, the terminals also read the cell-specific broadcast information, which provides the terminal with enough information to access the system and perform registration/attach procedures.

In another embodiment, only the SBCCH is broadcast whereas synchronization and cell identification is performed on a cell-by-cell basis. In this case, cell-specific control information may be read first by the mobile, and may provide a pointer to the location of the SBCCH, which gives considerably more control information.

Three embodiments for handling cell-specific information are described herein. In the first embodiment, all of the cell-specific information for the different cells in the system is collated and sent as part of the information broadcast as described above. From this omnibus broadcast message, the MS gleans the information specific to the cell to which the MS is currently connected or wishes to connect. In the second embodiment, only the system-specific information is broadcast from all cells simultaneously. Cell-specific information is sent from each individual cell. Since the amount of information that must be sent on a per-cell basis is reduced, stronger coding can be utilized to achieve sufficient coverage. In a third embodiment, part of the cell-specific information is broadcast from all cells, and another part of the cell-specific information is sent from each individual cell.

FIG. 1 is an illustrative drawing of the transmission sequences utilized in two cells in the first embodiment of the present invention. All cells transmit the broadcast information 11 common to all cells at the same time with some periodicity. At other times, data and other (possibly control) transmissions 12 to mobiles in each cell are performed. During the broadcast interval, the MS receives the signal and performs demodulation and decoding to exploit the effects of macro-diversity in an advantageous manner.

During the transmission of the cell-specific information, the system is designed so that the signal structure across cells is different enough (e.g., different pilots, etc.) to permit proper reception in the presence of co-channel interference.

FIG. 2 is an illustrative drawing of an exemplary message structure of the broadcast message according to the first embodiment.

FIG. 3 is an illustrative drawing of the transmission sequences utilized in two cells in the second embodiment of the present invention. In this embodiment, the broadcast transmission 11 contains only the information that is relevant to all cells. Different cells then separately transmit cell-specific data and other transmissions 12, and cell-specific control information 13. It should be noted that although FIG. 3 shows that cells 1 and 2 transmit the cell-specific information at different times, this is not necessary, and the cell-specific information may be transmitted at the same time. It should also be noted that the Broadcast Information is sent with a common signal format across all cells, but the cell-specific information is preferably sent with different signal formats in each cell so that MSs can distinguish the information from cell-to-cell. The cell-specific information may include a pointer to the broadcast transmission so that the broadcast transmission can be easily found by the MS.

In a third embodiment of the present invention, the system broadcast channel broadcasts system-wide information and a list of cell identifiers. The system broadcast channel may also send some cell-specific information that can be used by the mobile station for the purposes of making an initial access to the system. Alternatively, a portion of the information needed for initial access may be sent on a cell-specific broadcast basis. After the mobile station makes the initial access, the system sends more detailed system information to the mobile station using a point-to-point link. Thus, the relevant information is sent using a combination of system broadcast, possibly cell broadcast, and a point-to-point transaction. This embodiment minimizes the amount of information that is sent on a broadcast basis, thereby saving broadcast resources. In addition, the information sent to the mobile station may be sent using the modulation and coding scheme best suited for the mobile station rather than being dimensioned for the worst possible user.

The present invention also improves the efficiency of paging procedures in cellular systems. In traditional paging procedures, the service area of the cellular system is divided into Location Areas (LAs), each of which may include several cells. Mobile stations (MSs) perform LA updates whenever they cross an LA boundary. MSs also perform periodic LA updates and LA updates at deregistration. Other terms such as Routing Areas are also used in some systems, but the invention is not meant to be restrictive to any particular system or definition of such an area. Whenever an MS is paged, it is paged in all of the cells within the LA in which the MS last reported. With traditional paging methods, a separate paging message is sent in each of the cells in the location area, and the mobile reads the paging message on the paging channel of the cell in which it is camped. The paging signals or other signals transmitted at the same time from the other cells are treated as interference by the mobile, and this affects the performance of the mobile receiver.

With the present invention, the paging message is sent over the entire system using a single broadcast message that is simultaneously broadcast from all base stations. This has several effects. First, it eliminates the need for LA updates, thereby saving uplink bandwidth and power. Second, reception of the broadcast signal requires a lower signal-to-interference-plus-noise ratio at the mobile. Thus, transmission of the paging signal in this form should require fewer downlink resources. Alternatively, the LA updates may still be used, but the paging signal may still be sent using synchronous and simultaneous broadcast over the cells in the LA.

FIG. 4 is a simplified block diagram of a mobile station transceiver 20 modified in accordance with an exemplary embodiment of the present invention. A receiver 21 receives the signal and sends it to Synchronization Unit 22, which synchronizes to the SSCH. The synchronization information from synchronization unit 22 is used by a System-Specific Control Information Unit 23, which reads the system-specific control information transmitted by all cells. Pointer information obtained by the System-Specific Control Information Unit 23 and synchronization information obtained from the Synchronization Unit 22 are used by a Cell-Specific Control Information and Cell Identification Unit 24 to select a suitable cell and to read the cell-specific control information transmitted by the selected cell. The system-specific and cell-specific information, together with synchronization information, are provided to an Access Unit 25. Thereafter, a transmitter 26 sends an initial access message to the system.

Figure 5:
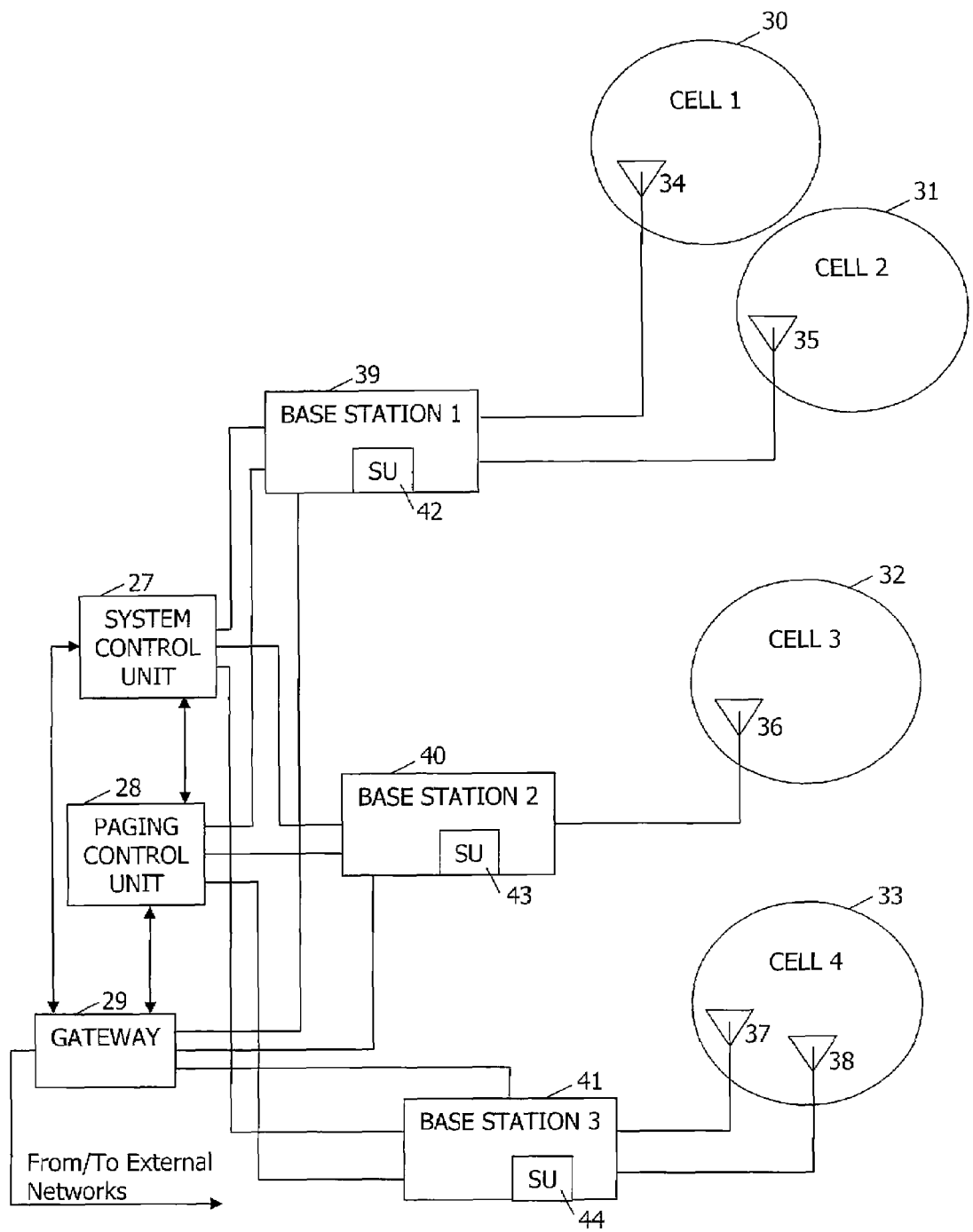
FIG. 5 is a simplified block diagram of a system in accordance with an exemplary embodiment of the present invention.

FIG. 5 is a simplified block diagram of a system modified in accordance with an exemplary embodiment of the present invention. Base stations 39, 40, and 41 use transmitters 34, 35, 36, 37, and 38 to transmit on the downlink to cells 30, 31, 32, and 33. As shown in FIG. 5, it is possible for a base station to transmit to one cell or multiple cells. Also, a base station may use multiple transmitters to transmit to the same cell using, for example, distributed antenna systems. The base stations are connected to a System Control Unit 27 that controls the broadcast information that is sent by the different transmitters. The base stations are also connected to a Paging Control Unit 28 that decides when and on what transmitters a paging message is sent. This may be done in response to a request for a call received from an external network.

The base stations 39, 40, and 41 are also connected to a Gateway 29 that allows connection to external networks. Note that although the System Control Unit 27, the Paging Control Unit 28, and the Gateway 29 are shown as different units in FIG. 5, they may be only logical units within the same physical enclosure, or may be virtual units each of whose functionality is distributed among multiple physical units. FIG. 5 also shows Synchronization Units (SU) 42, 43, and 44 in base stations 39, 40, and 41, respectively. The SUs are used to ensure that the base stations are synchronized in time and frequency, which is necessary for proper operation of the macro-diversity operation as described herein.

The following paragraphs describe general principles for the physical layer design for OFDM-based signals.

The SSCH utilizes a sequence that allows good time and frequency localization, even in the presence of significant Inter-Symbol Interference (ISI). The SBCCH utilizes a pilot pattern that is well suited to estimate the channel response in order to perform demodulation. When based on OFDM, both of these logical channels preferably utilize a cyclic prefix that is larger than is normally sufficient for single cell operation. This is due to the fact that the MS must receive multiple signal paths from many base stations, and these can occur with longer delays than would be commonly seen in single-cell operation.

Most traditional OFDM systems use repeated OFDM symbols for the purpose of initial synchronization. The receiver tries to correlate data a fixed time apart and searches for a maximum of such a correlation. It can be shown that the correlation is a measure of the channel energy at the correct synchronization point, and the use of macro-diversity with more channel taps improves the initial synchronization. This is in addition to the SNR gain (and the interference reduction) that is to be expected with macro-diversity. Similarly, the reception of the SBCCH is also expected to exhibit performance that is better than reception without macro-diversity.

The channels used to send cell-specific control information and user data need not be different than channels that may be used in a conventional system. In particular, with OFDM, there is no need for a longer cyclic prefix. Thus, when the mobile station attempts to find the cell identifiers after reading the SBCCH, it looks for a signal with a smaller cyclic prefix, and therefore, needs to refine the synchronization information obtained from the SSCH and SBCCH.

Thus, the present invention provides a new paradigm for the cellular network wherein most common functionalities such as initial synchronization and system information broadcasts are handled by exploiting macro-diversity to the fullest. In contrast to existing systems in which a mobile station initially finds a cell, and then synchronizes to the cell, in the present invention, the mobile station initially synchronizes to the system, and then finds a suitable cell. The present invention exhibits significantly better performance for initial synchronization. In addition, the use of macro-diversity enables the delivery of system information in a more efficient manner.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A wireless multi-cellular telecommunication system having a plurality of base stations that transmit signals within a plurality of associated cells, said system comprising:
   means for synchronously and simultaneously broadcasting from a predefined group of base stations, system-specific control information common to all cells;
   means for transmitting individually from each base station in the group, cell-specific control information; and
   a mechanism for cell identification, wherein a mobile station operating within one of the cells identifies the cell to which the mobile station is connected by detecting a unique physical-layer cell characteristic of the cell, wherein the unique physical-layer cell characteristic is a unique synchronization pattern.

2. The system according to claim 1, wherein the means for synchronously and simultaneously broadcasting system-specific control information includes means for simultaneously broadcasting an identical message from each base station.

3. The system according to claim 1, wherein the means for transmitting, cell-specific control information from each base station includes means for transmitting a message from each base station that can vary from cell-to-cell.

4. The system according to claim 3, wherein the means for transmitting cell-specific control information transmits the different messages at different times in each cell.

5. The system according to claim 3, wherein the means for transmitting cell-specific control information transmits the different messages at the same time in at least two cells.

6. A wireless multi-cellular telecommunication system having a plurality of base stations that transmit signals within a plurality of associated cells, said system comprising:
   means for synchronously and simultaneously broadcasting from a predefined group of base stations, system-specific control information common to all cells;
   means for transmitting individually from each base station in the group, cell-specific control information; and
   a mechanism for cell identification, wherein a mobile station operating within one of the cells identifies the cell to which the mobile station is connected by detecting a unique physical-layer cell characteristic of the cell, wherein the unique physical-layer cell characteristic is a unique pilot pattern.

7. The system according to claim 6, wherein the means for broadcasting system-specific control information also broadcasts a cell identifier as part of the system-specific control information.

8. The system according to claim 6, wherein the system utilizes Orthogonal Frequency Division Multiplexing (OFDM).

9. The system according to claim 8, wherein the means for synchronously and simultaneously broadcasting system-specific control information also utilizes a pilot pattern that is well suited to estimate the channel response in order to perform demodulation.

10. The system according to claim 8, wherein the means for synchronously and simultaneously broadcasting system-specific control information also utilizes a cyclic prefix that is larger than is normally sufficient for single-cell operation.

11. A wireless multi-cellular telecommunication system having a plurality of base stations that transmit signals within a plurality of associated cells, said system comprising:
    means for synchronously and simultaneously broadcasting from a predefined group of base stations, system-specific control information common to all cells;
    means for transmitting individually from each base station in the group, cell-specific control information; and
    means for simultaneously transmitting an identical synchronization signal from multiple base stations, wherein the synchronization signal has good time and frequency localization properties even in the presence of significant Inter-Symbol Interference (ISI).

12. A method of delivering broadcast information to mobile stations operating in a cellular communication system having a plurality of base stations that transmit signals within a plurality of associated cells, said method comprising:
    synchronously and simultaneously broadcasting from a predefined group of base stations, system-specific control information common to all cells;
    transmitting individually from each base station in the group, cell-specific control information; and
    identifying by a mobile station operating within one of the cells, the cell to which the mobile station is connected by detecting a unique physical-layer cell characteristic of the cell, said unique physical-layer cell characteristic being selected from a group consisting of a unique synchronization pattern and a unique pilot pattern.

13. The method according to claim 12, wherein the step of synchronously and simultaneously broadcasting system-specific control information includes simultaneously broadcasting an identical message from each base station.

14. The method according to claim 12, wherein the step of transmitting, cell-specific control information from each base station includes transmitting a message from each base station that can vary from cell-to-cell.

15. The method according to claim 14, wherein the step of transmitting cell-specific control information includes transmitting the different messages at different times in each cell.

16. The method according to claim 14, wherein the step of transmitting cell-specific control information includes transmitting the different messages at the same time in each cell.

17. The method according to claim 12, wherein the step of broadcasting system-specific control information includes broadcasting a cell identifier as part of the system-specific control information.

18. The method according to claim 12, wherein the step of transmitting cell-specific control information includes:
    collating the cell-specific information for all of the base stations in the group; and
    transmitting the collated cell-specific information from each base station.

19. The method according to claim 12, wherein the step of transmitting cell-specific control information includes:
    transmitting individually from each base station in the group, a first portion of the cell-specific control information;
    wherein a second portion of the cell-specific control information is broadcast from the predefined group of base stations.

20. A method of delivering broadcast information to mobile stations operating in a cellular communication system having a plurality of base stations that transmit signals within a plurality of associated cells, said method comprising:

synchronously and simultaneously broadcasting from a predefined group of base stations, system-specific control information common to all cells and a list of cell identifiers;

broadcasting cell-specific information needed by a mobile station to make an initial system access, wherein a mobile station operating within one of the cells identifies the cell to which the mobile station is connected by detecting a unique physical-layer cell characteristic of the cell, wherein the unique physical-layer cell characteristic is a unique synchronization pattern; and after the mobile station has made the initial system access, transmitting more detailed system information to the mobile station using a point-to-point link.

21. A wireless multi-cellular telecommunication system having a plurality of base stations that transmit signals within a plurality of associated cells, said system comprising:

means for synchronously and simultaneously broadcasting from a predefined group of base stations, system-specific control information common to all cells and a list of cell identifiers;

means for broadcasting cell-specific information needed by a mobile station to make an initial system access, wherein a mobile station operating within one of the cells identifies the cell to which the mobile station is connected by detecting a unique physical-layer cell characteristic of the cell, wherein the unique physical-layer cell characteristic is a unique pilot pattern; and means responsive to the initial system access by the mobile station, for transmitting more detailed system information to the mobile station using a point-to-point link.

* * * * *